US012358312B2

(12) United States Patent
Okada

(10) Patent No.: US 12,358,312 B2
(45) Date of Patent: Jul. 15, 2025

(54) PRINTING APPARATUS AND METHOD OF CONTROLLING PRINTING APPARATUS

(71) Applicant: SEIKO EPSON CORPORATION, Tokyo (JP)

(72) Inventor: Hiroyoshi Okada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 4 days.

(21) Appl. No.: 18/418,538

(22) Filed: Jan. 22, 2024

(65) Prior Publication Data

US 2024/0246348 A1 Jul. 25, 2024

(30) Foreign Application Priority Data

Jan. 24, 2023 (JP) ................................ 2023-008585

(51) Int. Cl.

| | |
|---|---|
| ***B41J 11/66*** | (2006.01) |
| ***B41J 11/00*** | (2006.01) |
| ***B41J 11/24*** | (2006.01) |
| ***B41J 11/70*** | (2006.01) |
| ***B41J 27/12*** | (2006.01) |
| ***B41J 29/387*** | (2006.01) |

(52) U.S. Cl.

CPC ......... *B41J 29/387* (2013.01); *B41J 11/0005* (2013.01); *B41J 11/70* (2013.01); *B41J 27/12* (2013.01)

(58) Field of Classification Search

None

See application file for complete search history.

(56) References Cited

U.S. PATENT DOCUMENTS

| | | | | |
|---|---|---|---|---|
| 5,717,836 A * | 2/1998 | Horie | B65H 23/34 | 399/385 |
| 2015/0158314 A1* | 6/2015 | Miyashita | B41J 11/42 | 347/16 |
| 2017/0203582 A1* | 7/2017 | Ishikawa | B41J 11/70 | |
| 2018/0093504 A1* | 4/2018 | Kasai | B41J 11/663 | |
| 2022/0134781 A1* | 5/2022 | Kobayashi | B41J 2/32 | 347/215 |

FOREIGN PATENT DOCUMENTS

JP 2018-118388 A 8/2018

* cited by examiner

*Primary Examiner* — Leslie J Evanisko

(74) *Attorney, Agent, or Firm* — WORKMAN NYDEGGER

(57) ABSTRACT

A printing apparatus includes a transport unit including a roller that transports a recording sheet in a transport direction, a transport motor that rotates the roller, and a driving circuit that drives the transport motor, a head that performs printing on the recording sheet, a cutter that cuts the recording sheet, and a control unit. The control unit puts the transport motor into a hold state by the driving circuit when the recording sheet is cut by the cutter, and puts the transport motor into a short brake state by the driving circuit after the recording sheet is cut by the cutter.

5 Claims, 6 Drawing Sheets

PRINTING APPARATUS AND METHOD OF CONTROLLING PRINTING APPARATUS

The present application is based on, and claims priority from JP Application Serial Number 2023-008585, filed Jan. 24, 2023, the disclosure of which is hereby incorporated by reference herein in its entirety.

BACKGROUND

1. Technical Field

The present disclosure relates to a printing apparatus and a method of controlling a printing apparatus.

2. Related Art

In the related art, as described in JP-A-2018-118388, a printer in which a motor is energized in a state in which rotation of the motor of transport means is stopped, when a recording medium is detected by detection means after the recording medium is cut by cutting means has been known.

Since the above-described printer requires detection means and the motor is also continuously energized when a recording medium is detected by the detection means, power consumption may increase.

SUMMARY

Provided is a printing apparatus including a transport unit including a roller that transports a recording sheet in a transport direction, a transport motor that rotates the roller, and a driving circuit that drives the transport motor, a head that performs printing on the recording sheet, a cutter that cuts the recording sheet, and a control unit. The control unit puts the transport motor into a hold state by the driving circuit when the recording sheet is cut by the cutter, and puts the transport motor into a short brake state by the driving circuit after the recording sheet is cut by the cutter.

Provided is a method of controlling a printing apparatus, the printing apparatus including a transport unit including a roller that transports a recording sheet in a transport direction, a transport motor that rotates the roller, and a driving circuit that drives the transport motor, a head that performs printing on the recording sheet, and a cutter that cuts the recording sheet. The method includes putting the transport motor into a hold state by the driving circuit when the recording sheet is cut by the cutter, and putting the transport motor into a short brake state by the driving circuit after the recording sheet is cut by the cutter.

DESCRIPTION OF EMBODIMENTS

1. First Embodiment

1-1. Configuration of Printing Apparatus

Hereinafter, the configuration of a printing apparatus according to an embodiment will be described with reference to FIGS. 1 to 6. Note that directions in the figures will be explained using a three-dimensional coordinate system. For the sake of convenience of explanation, a positive direction of a Z-axis is referred to as an upward direction, upward, or simply up, a negative direction of the Z-axis is referred to as a downward direction, downward, or simply down, a positive direction of an X-axis is referred to as a right direction, a right side, or simply right, a negative direction of the X-axis is referred to as a left direction, a left side, or simply left, a positive direction of a Y-axis is referred to as a front direction, a front side, or simply front, and a negative direction of the Y-axis is referred to as a rear direction, a rear side, or simply rear.

Figure 1:
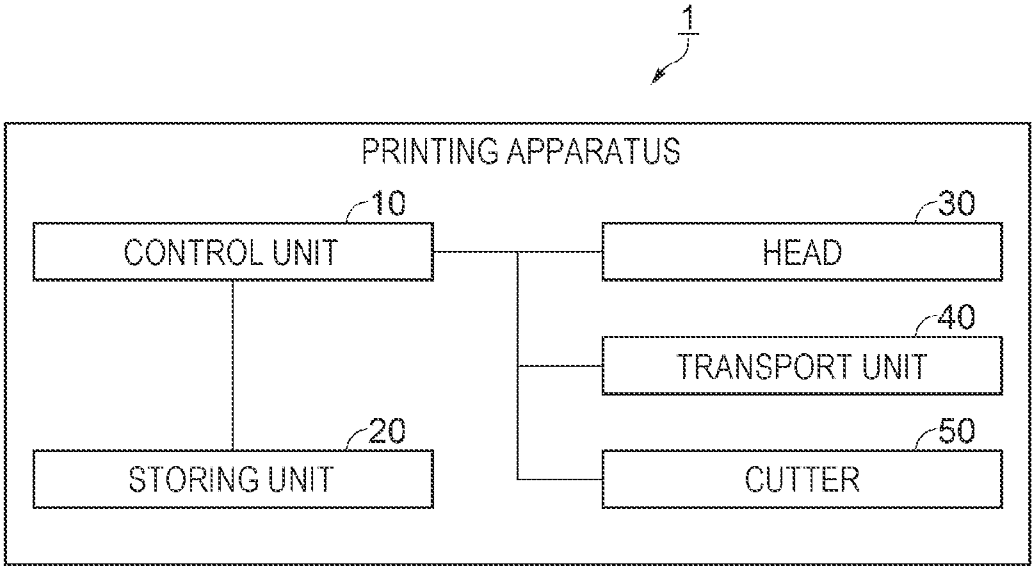
FIG. 1 is a block diagram illustrating a configuration of a printing apparatus.

A printing apparatus 1 according to the embodiment is, for example, used for printing in a point of sale (POS) system. As illustrated in FIG. 1, the printing apparatus 1 includes a control unit 10, a storing unit 20, a head 30, a transport unit 40, and a cutter 50. The control unit 10 causes the transport unit 40 to transport a recording sheet P described later and drives the head 30 to perform printing on the recording sheet P. The recording sheet P on which printing has been performed is cut by the cutter 50 and issued as a receipt or a slip.

The control unit 10 includes a central processing unit (CPU) that comprehensively controls each unit of the printing apparatus 1, a universal asynchronous receiver transmitter (UART) that manages input and output, a field programmable gate array (FPGA) and a programmable logic device (PLD) that are logic circuits, and the like. A CPU is also referred to as a processer. The storing unit 20 includes a flash read only memory (ROM) and a hard disk drive (HDD) that are rewritable nonvolatile memories, a random access memory (RAM) that is a volatile memory, and the like. The CPU of the control unit 10 reads a program such as firmware stored in the non-volatile memory of the storing unit 20, set information, and the like and uses the RAM of the storing unit 20 as a work area to implement the program.

Figure 2:
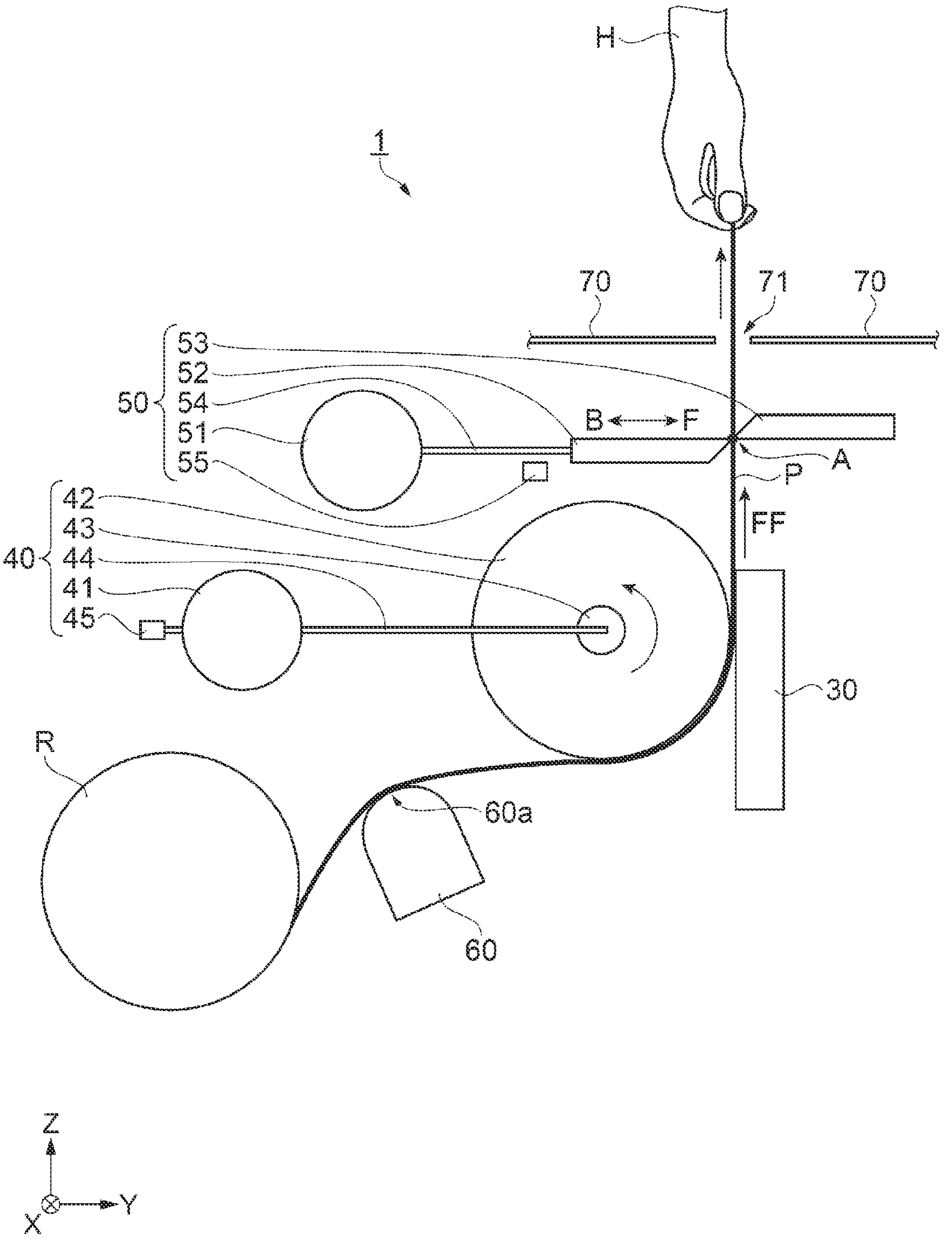
FIG. 2 is a schematic view illustrating principal portions of the printing apparatus.

As illustrated in FIG. 2, the transport unit 40 drives a transport motor 41 by a driving circuit 45 under the control of the control unit 10 and transmits torque to a roller 42 to rotate the roller 42 while reducing the speed via a transport gear group 44. The roller 42 to which torque is transmitted rotates counterclockwise and transports the recording sheet p in a transport direction FF. The roller 42 is made of a material such as a flexible resin such as rubber and is formed into a columnar shape. The roller 42 is located at a position facing the head 30 with the recording sheet P interposed therebetween and is also called a platen.

A rotation detection unit 43 is a so-called rotary encoder that detects the rotation speed of the roller 42. The transport motor 41 is, for example, a direct current motor. The control unit 10 performs pulse width modulation (PWM) control, which is control by a pulse width modulation system, on the transport motor 41 by inputting a detection signal of the rotation detection unit 43 and detecting and feeding back the rotation speed of the roller 42, so that the roller 42 rotates at a predetermined rotation speed. Note that the direct current motor is also called a DC motor.

The recording sheet P is, for example, elongated thermal paper. The head 30 is, for example, a line thermal head. The head 30 is located at a position facing the roller 42 with the recording sheet P interposed therebetween. The head 30 has a pressing mechanism (not illustrated) pressing toward the roller 42. The recording sheet P is caused to come into contact with the head 30 by the pressing mechanism and develops a color by heating of the head 30, whereby printing is performed. The control unit 10 controls the head 30 to perform printing based on printing data received from outside.

The recording sheet P is stored in the printing apparatus 1 as rolled paper R wound in a roll shape. By the rotation of the roller 42, the recording sheet P is drawn from the roll paper R and transported in the transport direction FF. Since the recording sheet P is wound in a roll shape, the recording sheet P is curled. The closer to the center of the roll paper R the recording sheet P is wound, the tighter the curl is. In addition, the thicker the recording sheet P is, the tighter the curl is.

A curl correction unit 60, which is a projection projecting toward the recording sheet P, is provided upstream in the transport direction FF with respect to the head 30 and the roller 42. A contact surface 60*a* of the curl correction unit 60 comes into contact with the recording sheet P that is transported, presses the curled recording sheet P to bend the recording sheet P in a reverse direction, and corrects the curl. In FIG. 2, the recording sheet P between the roll paper R and the roller 42 curls in a front-down direction. The curl correction unit 60 presses the recording sheet P in a rear-up direction, which is a reverse direction of the front-down direction, so that the curl can be corrected.

Note that a paper guide (not illustrated) is preferably provided at a position facing the contact surface 60*a* of the curl correction unit 60 with the recording sheet P interposed therebetween. As the curl of the recording sheet P becomes tighter, the recording sheet P tends to expand in a direction away from the contact surface 60*a* upstream and downstream of the contact surface 60*a* in the transport direction FF. Such expansion of the recording sheet P is pressed by the paper guide, so that the curl can be effectively corrected.

The cutter 50 is provided downstream in the transport direction FF with respect to the head 30 and the roller 42. The cutter 50 has a first blade 52 that is movable in a front-back direction and a second blade 53 that is fixed to a case 70 of the printing apparatus 1. The first blade 52 is also referred to as a so-called a movable blade, and the second blade 53 is also referred to as a so-called a fixed blade. The first blade 52 and the second blade 53 have a plate shape. The recording sheet P can be transported between the first blade 52 and the second blade 53. In the cutter 50, under the control of the control unit 10, a cutter motor 51 is rotated, and the first blade 52 is moved in the front-back direction via a cutter gear group 54. The first blade 52 moves below the second blade 53 so as to rub the second blade 53, thereby cutting the recording sheet P. The cutter motor 51 is, for example, a direct current motor.

The first blade 52 moves in a first direction F, which is a direction toward the second blade 53, and cuts the recording sheet P at a cut point A where the first blade 52 intersects with the second blade 53. After cutting, the first blade 52 moves in a second direction B, which is a direction away from the second blade 53, and retreats. The cutter 50 is provided with a position detector 55 that detects the position of the first blade 52. While the position detector 55 detects the position of the first blade 52, the control unit 10 can move the first blade 52 to a target position. The position detector 55 is composed of a mechanical switch, a photosensor, and the like.

A discharge port 71 for the recording sheet P is formed in the case 70. The discharge port 71 is located downstream of the cutter 50 in the transport direction FF. The recording sheet P on which printing has been performed by the head 30 is transported in the transport direction FF by the transport unit 40, cut by the cutter 50, and discharged from the discharge port 71. The recording sheet P discharged from the discharge port 71 can be taken out by a hand H of a user.

Figure 3:
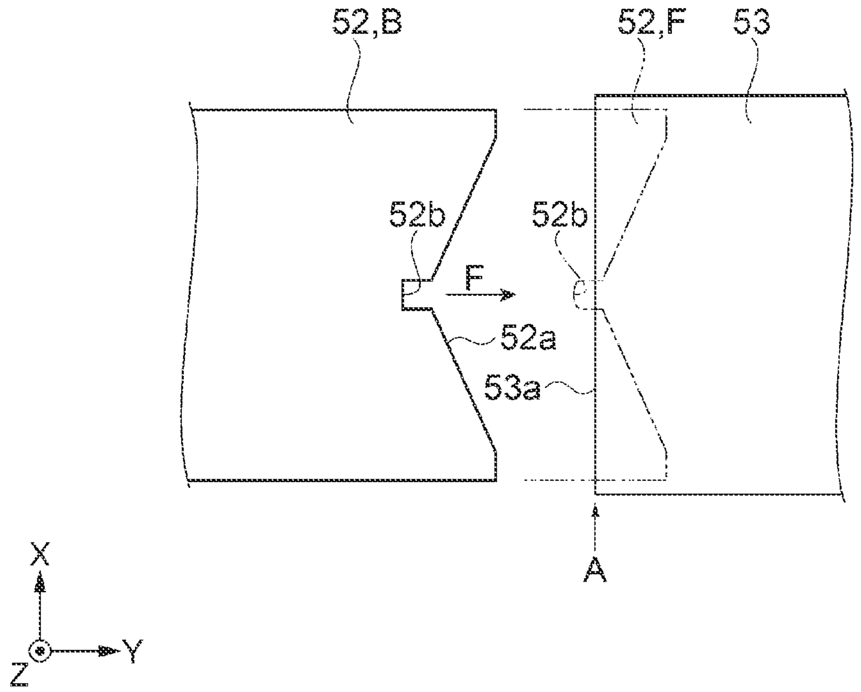
FIG. 3 is a schematic view when a first blade of a cutter moves toward a second blade.

As illustrated in FIG. 3, in the first blade 52, a first blade edge 52*a* having a V-shape that is inclined backward toward the center from the left and right ends is formed. In addition, at the center of the V-shape of the first blade 52, a cut-away portion 52*b* that is a portion not including the first blade edge 52*a* is formed. The cut-away portion 52*b* has a shape cut away into a rectangular shape. On the other hand, in the second blade 53, a second blade edge 53*a* having a linear shape in a left-right direction is formed. When the first blade 52 retreats, the first blade 52 is located at a position B, which is a rear side. When the recording sheet P is cut, the first blade 52 moves from the position B to the first direction F, which is a front side. At the cut point A, the first blade edge 52*a* of the first blade 52 intersects with the second blade edge 53*a* of the second blade 53 from the left and right ends toward the center so as to cut the recording sheet P.

When cutting of the recording sheet P ends, the first blade 52 reaches the position F where the first blade 52 moves the farthest in the first direction F. The first blade edge 52*a* at the position F exceeds the position of the second blade edge 53*a*, which is also the cut point A. However, at this time, the cut-away portion 52*b* of the first blade 52 does not exceed the position of the second blade edge 53*a*. That is, at the cut point A, the cut-away portion 52*b* does not intersect with the second blade edge 53*a* and thus does not cut the recording sheet P.

Figure 4:
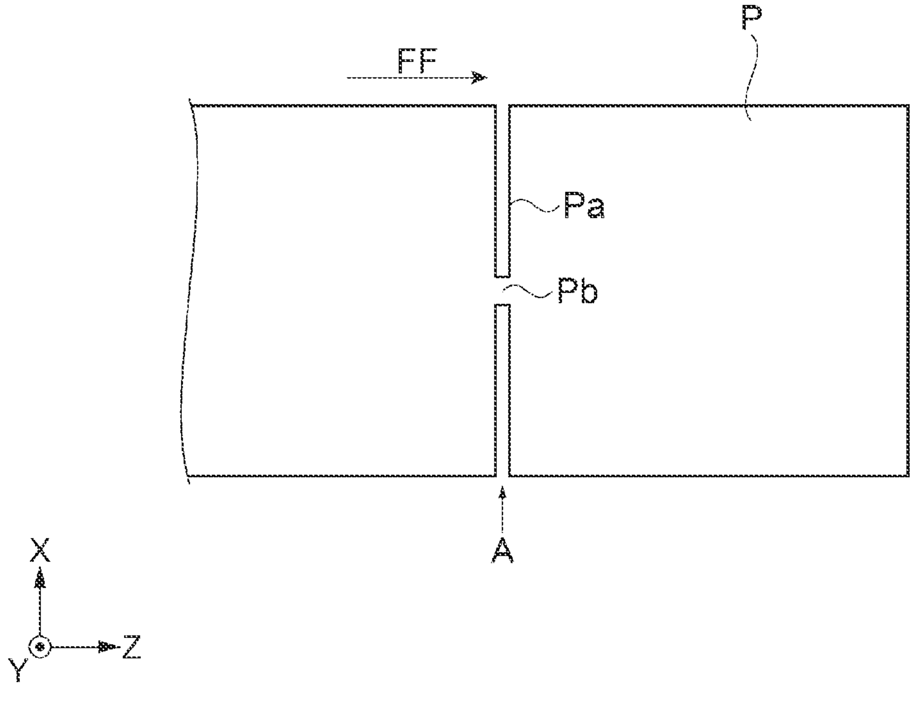
FIG. 4 is a schematic view illustrating a recording sheet cut by the cutter.

As a result, as illustrated in FIG. 4, at the cut point A, a cut portion Pa that is a cut portion of the recording sheet P and an uncut portion Pb that is an uncut portion of the recording sheet P are formed. That is, by the cut-away portion 52*b* of the first blade 52, the uncut portion Pb is formed in the recording sheet P. Partially cutting the recording sheet P by the cutter 50 such that the uncut portion Pb is formed is referred to as so-called partial cut. Since the recording sheet P subjected to partial cut is partially connected the elongated recording sheet P in the printing apparatus 1, after discharged from the discharge port 71, even if the user does not take out the recording sheet P, the recording sheet P does not scatter.

Note that the cut-away portion 52*b* of the first blade 52 can also be configured to exceed the position of the second blade edge 53*a*. In this case, the first blade 52 including the cut-away portion 52*b* can completely cut the recording sheet P so as not to produce the uncut portion Pb. Completely cutting the recording sheet P by the cutter 50 is referred to as so-called full cut. The recording sheet P subjected to full cut can be easily taken out by the user and handed to a customer.

Here, with reference to FIGS. 5 and 6, the driving circuit 45 that drives the transport motor 41 will be described. Note that in the following description, a driving voltage +24V illustrated in the figures is simply referred to as 24V. The driving circuit 45 has switches S1, S2, S3, and S4 and configures a so-called H bridge circuit. The driving circuit 45 also has a switch SP and can supply 24V to the transport motor 41 via the switch SP. Note that each switch can also be configured by a transistor such as a bipolar transistor, metal-oxide-semiconductor field-effect transistor (MOSFET), and the like. Turning ON and OFF of the respective transistors, which are the respective switches, are controlled by the control unit 10. For convenience, in the following description, the control unit 10 turns ON and OFF the respective switches.

Figure 5:
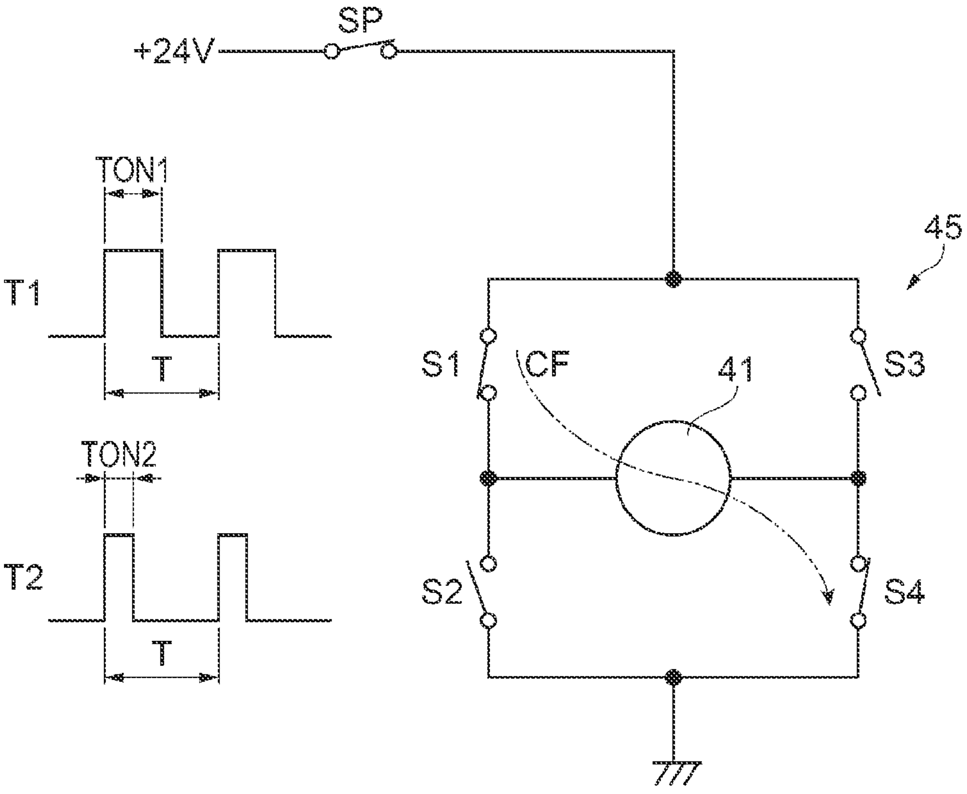
FIG. 5 is a schematic view illustrating a driving circuit of a transport motor during transportation of the recording sheet and in a hold state.

As illustrated in FIG. 5, when the switches S2 and S3 are turned OFF and the switch S1 and S4 are turned ON, the driving circuit 45 allows a driving current CF to flow. When the transport motor 41 is driven to transport the recording sheet P in the transport direction FF, the control unit 10 applies a first pulse T1 to the switch SP. The first pulse T1 turns ON the switch SP over a first time TON1 in a period T.

As described above, the control unit 10 can control supply of power to the transport motor 41 by a pulse having the first time TON1, which is a predetermined ON time in the period T, and can perform the above-described PWM control. The driving current CF intermittently flows in the transport motor 41. Note that at this time, the control unit 10 can control the length of the first time TON1 of the first pulse T1 by inputting a detection signal of the rotation detection unit 43 and detecting the rotation speed of the roller 42 so as to rotate the roller 42 at a predetermined rotation speed.

As a result, the transport motor 41 can generate torque that transports the recording sheet P. The roller 42 coupled to the transport motor 41 via the transport gear group 44 can rotate at a predetermined rotation speed and transport the recording sheet P at a predetermined speed.

On the other hand, when the transport motor 41 is put into a hold state, a second pulse T2, instead of the first pulse T1, is applied to the switch SP. The second pulse T2 turns ON the switch SP over a second time TON 2 in the period T. Over the second time TON2, 24V is supplied via the switch SP, and the driving current CF intermittently flows in the transport motor 41 via the switches S1 and S4.

The second time TON2 is set shorter than the first time TON1. As a result, torque that transports the recording sheet P cannot be generated in the transport motor 41, but torque having a degree to which the recording sheet P is held can be generated. In addition, the power consumption when the second pulse T2 is applied to the transport motor 41 is less than the power consumption when the first pulse T1 is applied. In addition, the roller 42 coupled to the transport motor 41 via the transport gear group 44 can hold the recording sheet P.

When the roller 42 transports the recording sheet P, torsion and deflection are generated due to the flexibility of the roller 42, and the roller 42 is deformed. While the roller 42 transports the recording sheet P, the roller 42 transports the recording sheet P in a state of being pressed by the pressing mechanism of the head 30 and deformed. Then, after the roller 42 finishes transporting the recording sheet P, the roller 42 attempts to restore its original shape from the deformed shape. At this time, a force for rotating the roller 42 clockwise, which is opposite to a direction at the time of transport, acts on the roller 42. When this force becomes larger than detent torque that works so as to hold the position of the roller 42 in the transport motor 41, the roller 42 rotates clockwise. When the roller 42 rotates clockwise, the recording sheet P is transported in a direction opposite to the transport direction FF. As a result, the position of the recording sheet P may be deviated. When the position of the recording sheet P is deviated, the printing quality may be deteriorated.

Therefore, when the cutter 50 is operated to cut the recording sheet P, the control unit 10 puts the transport motor 41 into the hold state. When the transport motor 41 is put into the hold state, the attempt of the roller 42 to restore its original shape to rotate clockwise is suppressed. When the transport motor 41 is not put into the hold state, the recording sheet P is transported downward, which is an opposite direction of the transport direction FF, and in a state in which the position of the recording sheet P is deviated, the cutter 50 may cut the recording sheet P. In other words, when the transport motor 41 is not put into the hold state, the format of a slip on which printing has been performed and which has been cut breaks down. However, when the transport motor 41 is put into the hold state, rotation of the roller 42 can be suppressed, and deviation of the position of the recording sheet P can be suppressed. In addition, in a state in which the position of the recording sheet P is held, the cutter 50 can cut the recording sheet P, and deterioration of the printing quality can be suppressed.

In addition, as described above, since the curl correction unit 60 comes into contact with the recording sheet P and bends the recording sheet P upstream of the roller 42, when the recording sheet P is pulled up, the curl correction unit 60 can act as a load. Therefore, when the cutter 50 cuts the recording sheet P, the curl correction unit 60 can suppress pulling out of the recording sheet P. In addition, the power consumption of the transport motor 41 in the hold state is less than the power consumption of the transport motor 41 when the recording sheet P is transported.

Figure 6:
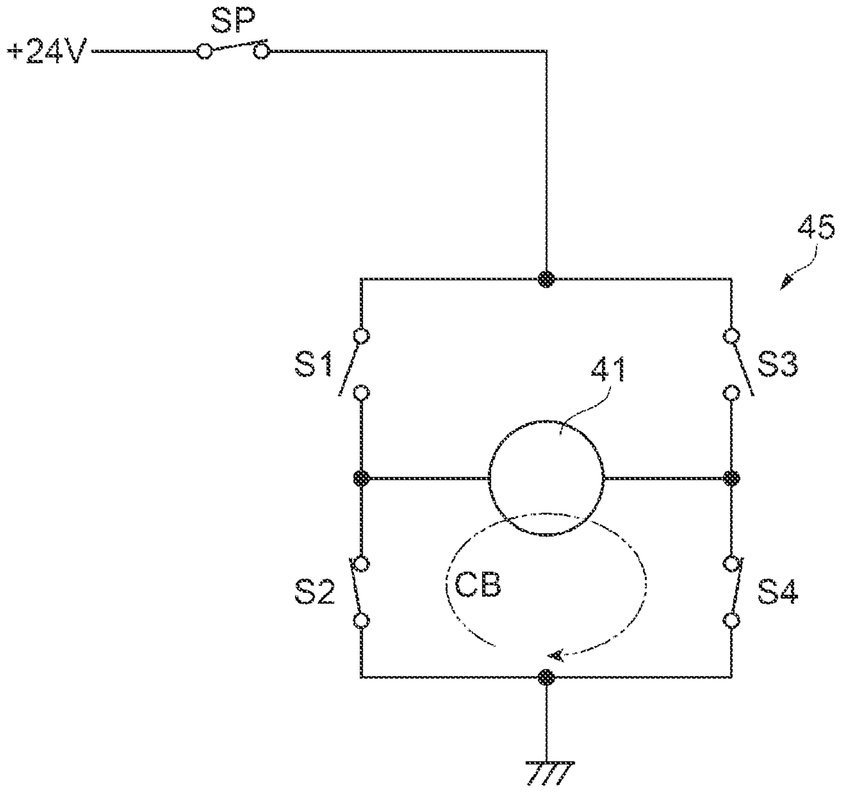
FIG. 6 is a schematic view illustrating the driving circuit of the transport motor in a short brake state.

As illustrated in FIG. 6, when the switches S1 and S3 are turned OFF and the switches S2 and S4 are turned ON, the driving circuit 45 allows a short brake current CB to flow and can put the transport motor 41 into a short brake state. The short brake current CB is a current that can be circulated through the switches S2 and S4 and the transport motor 41. Since the switches S1 and S3 are turned OFF, 24V is not supplied to the transport motor 41. Note that at this time, the switch SP may be turned OFF. In addition, the switches S1 and S3 may be turned ON, and the switches S2 and S4 may be turned OFF.

When the switches S2 and S4 are turned ON, the transport motor 41 can be short-circuited. As a result, the transport motor 41 functions as a generator and acts such that a brake is applied to a force for rotating the transport motor 41. That is, when the transport motor 41 is caused to rotate, a counter electromotive force is generated, and a brake is applied to the transport motor 41. At this time, the short brake current CB flows. The short brake current CB is consumed by internal resistance of the transport motor 41 and the like. In addition, a brake is also applied to the roller 42 coupled to the transport motor 41 via the transport gear group 44 by the transport motor 41 in the short brake state against the force for rotating the roller 42.

As described above, the recording sheet P on which printing has been performed by the head 30 and which has been partially cut by the cutter 50 is discharged from the discharge port 71. At this time, the recording sheet P that has been discharged is partially connected to the elongated recording sheet P in the printing apparatus 1 by the uncut portion Pb. When the recording sheet P that has been discharged from the discharge port 71 is taken out by the hand H of the user, the recording sheet P, in the printing apparatus 1, partially connected by the uncut portion Pb may also be taken out together upward, which is the transport direction FF. At this time, the recording sheet P that is pinched by the head 30 and the roller 42 is also pulled upward, and a force for rotating the roller 42 is applied.

Therefore, when a state in which after the cutting of the recording sheet P by the cutter 50 ends, the recording sheet P that has been discharged from the discharge port 71 is ready to be taken out by the hand H of the user is reached, the control unit 10 puts the transport motor 41 into the short brake state. As described above, when the recording sheet P that has been discharged from the discharge port 71 is taken out by the hand H of the user, a force for rotating the roller 42 is applied. However, by the transport motor 41 in the short brake state, a brake is applied to the force for rotating the roller 42.

As a result, rotation of the roller 42 is suppressed. That is, the recording sheet P pinched between the head 30 and the roller 42 can be held so as not to be pulled out. In this manner, by the transport motor 41 in the short brake state, the recording sheet P can be held via the roller 42. When the recording sheet P that has been discharged from the discharge port 71 is taken out by the hand H of the user, pulling out of the recording sheet P, in the printing apparatus 1, partially connected by the uncut portion Pb can be suppressed.

In addition, as described above, at this time as well, since the curl correction unit 60 comes into contact with the recording sheet P upstream of the roller 42 and bends the recording sheet P, when the recording sheet P is pulled upward, the curl correction unit 60 can act as a load. Therefore, when the recording sheet P that has been discharged from the discharge port 71 is taken out by the hand H of the user, pulling out of the recording sheet P, in the printing apparatus 1, partially connected by the uncut portion Pb can be suppressed. In addition, as described above, when the control unit 10 puts the transport motor 41 into the short brake state, the control unit 10 does not supply 24V to the transport motor 41. Therefore, even if the control unit 10 continuously puts the transport motor 41 into the short brake state, the power is not consumed for the transport motor 41.

Note that when all of the switches S1, S2, S3, and S4 of the driving circuit 45 are turned OFF, the transport motor 41 enters a free state in which the holding force does not work, and the recording sheet P is taken out freely by the hand H of the user.

1-2. Method of Controlling Printing Apparatus

Figure 7:
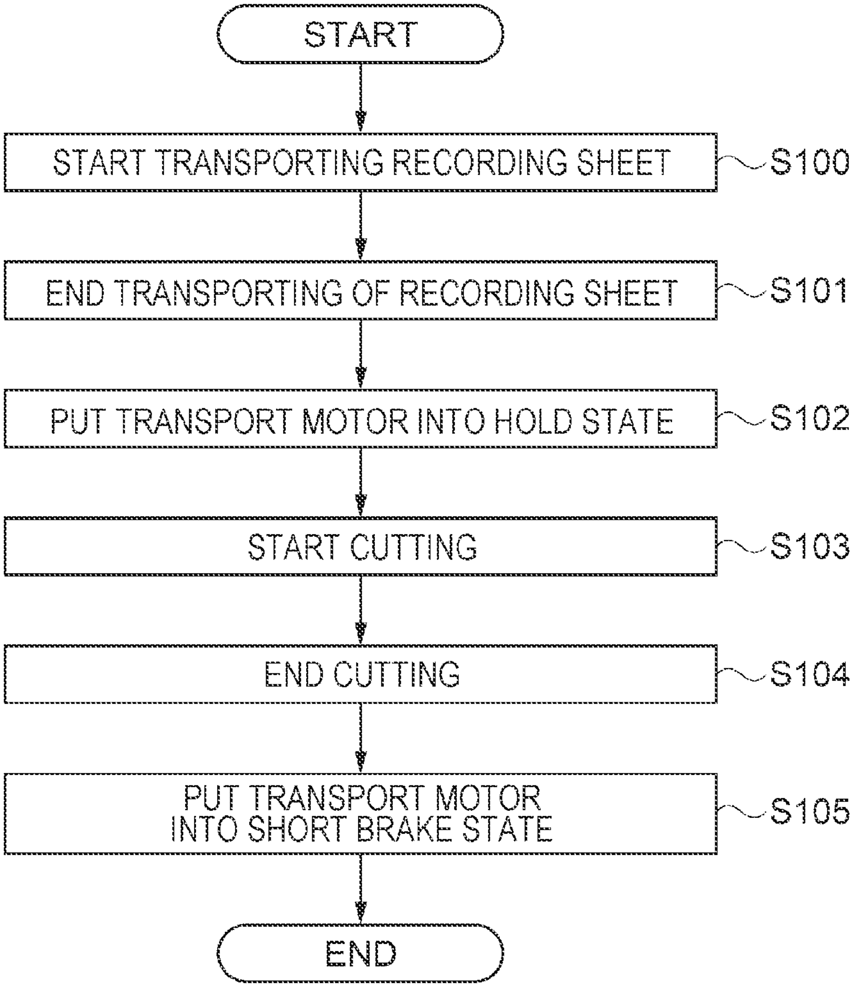
FIG. 7 is a flowchart illustrating control of a transport unit and the cutter.

As illustrated in FIG. 7, when printing is performed based on printing data and the like, the control unit 10 starts transporting the recording sheet P by the transport unit 40 (S100). Specifically, the control unit 10 starts PWM control in which the switches S2 and S3 of the driving circuit 45 of the transport unit 40 are turned OFF, the switches S1 and S4 are turned ON, the first pulse T1 is applied to the switch SP, and the driving current CF is caused to intermittently flow through the transport motor 41. As a result, the transport motor 41 can generate torque that transports the recording sheet P. The transport motor 41 transmits the torque to the roller 42 coupled via the transport gear group 44, and can start transporting the recording sheet P.

Note that after starting transporting the recording sheet P, the control unit 10 inputs a detection signal of the rotation detection unit 43, detects the rotation speed of the roller 42, and controls the length of the first time TON1 of the first pulse T1 so as to rotate the roller 42 at a predetermined speed. The control unit 10 transports the recording sheet P at a predetermined speed, and at the same time, can control the head 30 to perform printing on the recording sheet P based on the printing data.

When printing based on the printing data is ended, the control unit 10 ends transporting of the recording sheet P by the transport unit 40 (S101). The control unit 10 applies the second pulse T2 to the switch SP of the driving circuit 45 of the transport unit 40 so as to put the transport motor 41 in the hold state (S102). As a result, the transport motor 41 can generate torque that holds the recording sheet P. The transport motor 41 in the hold state transmits the torque to the roller 42 coupled via the transport gear group 44, and can hold the recording sheet P.

Next, the control unit 10 starts cutting the recording sheet P by the cutter 50 (S103). When the first blade 52 of the cutter 50 moves and cuts the recording sheet P, the transport motor 41 is in the hold state. When the first blade 52 moves, the recording sheet P can be held so that the position of the recording sheet P is not deviated via the roller 42 by the transport motor 41 in the hold state. In addition, the power consumption of the transport motor 41 in the hold state is less than the power consumption of the transport motor 41 when the recording sheet P is transported.

Next, the control unit 10 ends cutting of the recording sheet P by the cutter 50 (S104). The control unit 10 can detect the position of the first blade 52 by the position detector 55 of the cutter 50. When the position detector 55 detects that the first blade 52 moves in the second direction B and retreats, the control unit 10 can determine that the cutting by the first blade 52 has ended.

Next, the control unit 10 puts the transport motor 41 into the short brake state (S105). Specifically, the control unit 10 turns OFF the switches S1 and S3 of the driving circuit 45, and turns ON the switches S2 and S4 so as to allow the short brake current CB to flow. As a result, a brake is applied to the force for rotating the roller 42 by the transport motor 41 in the short brake state, and the recording sheet P can be held. When the recording sheet P that has been discharged from the discharge port 71 is taken out by the hand H of the user, pulling out of the recording sheet P in the printing apparatus 1 due to the uncut portion Pb can be suppressed. In addition, even if the control unit 10 continuously puts the transport motor 41 into the short brake state, the power is not consumed for the transport motor 41.

According to the printing apparatus 1 according to the above-described embodiment, when the recording sheet P is cut by the cutter 50, the control unit 10 puts the transport motor 41 into the hold state by the driving circuit 45, and after the recording sheet P is cut by the cutter 50, the control unit 10 puts the transport motor 41 into the short brake state by the driving circuit 45.

As a result, even if the control unit 10 continuously puts the transport motor 41 into the short brake state, the power consumption of the transport motor 41 can be suppressed. In addition, the power consumption of the transport motor 41 in the hold state is less than the power consumption of the transport motor 41 when the recording sheet P is transported. Moreover, the control unit 10 can suppress deviation of the position of the recording sheet P during cutting, and can also suppress pulling out of the recording sheet P after cutting. After the recording sheet P is cut by the cutter 50, a detection means for detecting the recording sheet P is also unnecessary.

Although the embodiments have been described in detail with reference to the drawings above, the specific configurations are not limited to the embodiments but may be changed, replaced, deleted, or the like without departing from the spirit of the present disclosure.

The head 30 has been described in the example of a thermal head, but the printing system does not matter. For example, the head 30 may be an ink jet head. In this case, since the ink jet head cannot come into contact with the roller 42 to pinch the recording sheet P, a driven roller that faces the roller 42 and pinches the recording sheet P may be mounted to the case 70.

The cutter 50 has been described in the example of the first blade 52 having a V-shape, but as long as partial cut can be performed, the shape of the blade or the cutting system does not matter. A so-called scissors system in which a movable blade rotates around a fulcrum may be adopted, and a rotary cutter system may be adopted.

What is claimed is:

1. A printing apparatus comprising:

a transport unit including a roller that transports a recording sheet in a transport direction, a transport motor that rotates the roller, and a driving circuit that drives the transport motor;

a head that performs printing on the recording sheet;

a cutter that cuts the recording sheet; and a control unit, wherein the control unit puts the transport motor into a hold state by the driving circuit when the recording sheet is cut by the cutter, and puts the transport motor into a short brake state by the driving circuit after the recording sheet is cut by the cutter.

2. The printing apparatus according to claim 1, wherein the cutter includes a second blade and a first blade configured to move toward the second blade, and the first blade is provided with a portion that does not include a blade edge and forms an uncut portion where the recording sheet is not cut.

3. The printing apparatus according to claim 1, further comprising a curl correction unit configured to correct curl of the recording sheet wound in a roll shape upstream in the transport direction with respect to the head and the roller.

4. The printing apparatus according to claim 1, wherein the transport motor is a direct current motor, and the control unit puts the transport motor into the hold state by a pulse width modulation system.

5. A method of controlling a printing apparatus, the printing apparatus including a transport unit including a roller that transports a recording sheet in a transport direction, a transport motor that rotates the roller, and a driving circuit that drives the transport motor, a head that performs printing on the recording sheet, and a cutter that cuts the recording sheet, the method comprising:

putting the transport motor into a hold state by the driving circuit when the recording sheet is cut by the cutter; and putting the transport motor into a short brake state by the driving circuit after the recording sheet is cut by the cutter.

* * * * *